United States Patent [19]

McBride

[11] 4,256,323
[45] Mar. 17, 1981

[54] VEHICLE TRUNK MOUNTED FIFTH WHEEL TRAILER HITCH

[76] Inventor: Paul R. McBride, 1970 Table Rock Rd. #3, Medford, Oreg. 97501

[21] Appl. No.: 4,287

[22] Filed: Jan. 17, 1979

[51] Int. Cl.³ .............................................. B62D 53/04
[52] U.S. Cl. ................................. 280/423 R; 280/495
[58] Field of Search .............. 280/423 R, 423 B, 511, 280/495, 496, 497; 248/181, 164, 431, 176, 159

[56] References Cited

U.S. PATENT DOCUMENTS

| | | | |
|---|---|---|---|
| 1,218,631 | 3/1917 | Monts | 280/511 |
| 2,321,901 | 6/1943 | Eddy | 248/181 |
| 2,628,106 | 2/1953 | Sturwold | 280/423 B |
| 3,390,896 | 7/1968 | Philapy | 280/423 R |
| 3,722,917 | 3/1973 | Mims | 280/423 R |
| 3,790,189 | 2/1974 | Winter | 280/423 R |
| 3,801,135 | 4/1974 | Winter | 280/423 R |
| 3,807,763 | 4/1974 | Knott | 280/423 R |
| 3,825,281 | 7/1974 | Howard | 280/423 R |
| 3,881,750 | 5/1975 | Shatto | 280/423 R |
| 4,063,749 | 12/1977 | Tracy | 280/423 R |

Primary Examiner—Randolph A. Reese
Assistant Examiner—Randall A. Schrecengost

Attorney, Agent, or Firm—Harvey B. Jacobson

[57] ABSTRACT

Base plate structure is provided for overlying and securement to the floor of interior of the rear trunk area of a passanger vehicle and a tubular standard has its lower end supported from and anchored relative to a central plan area of the base plate structure. Inclined braces are spaced about the standard and have their upper ends anchored relative to the upper end portion of the standard and their lower ends anchored relative to portions of the base plate structure spaced outwardly from and about the lower end portion of the standard. The upper terminal end of the standard projects above the upper ends of the inclined braces and may project through an opening provided in the horizontal body portion of the associated vehicle disposed forward of the forward marginal edge of the trunk lid thereof and rearward of the lower marginal edge of the rear window of the vehicle. A hitch ball is provided and includes a depending stem downwardly telescoped into and releasably secured within the standard. The hitch ball projects upwardly above the upper terminal end of the standard and is fully exposed for releasable engagement with a hitch socket portion carried by the elevated forward tongue portion of an associated trailer.

4 Claims, 6 Drawing Figures

VEHICLE TRUNK MOUNTED FIFTH WHEEL TRAILER HITCH

BACKGROUND OF THE INVENTION

Although conventional trailers to be towed behind passenger vehicles equipped with rear mounted hitch balls adjacent the rear bumpers of the associated vehicles enjoy considerable popularity, the advantages of fifth wheel-type trailers for removable coupling to hitch structures carried in the bed of a pickup truck and positioned over the rear axle of the associated pickup truck are fast increasing the popularity of pickup truck-fifth wheel trailer combinations.

While more even weight distribution, greater control and easier backing advantages may be readily realized through the utilization of a fifth wheel trailer in conjuction with a pickup truck having a hitch mounted in the bed thereof over the rear axle of the pickup truck, because of the different structure of the rear portion of the passenger vehicle the same advantages associated with fifth wheel trailers may not be realized by those persons wishing to tow a trailer behind a conventional passenger vehicle. Accordingly, a need exists for a hitch construction which may be utilized in conjunction with a passenger vehicle in order to enable that vehicle to tow a fifth wheel-type of trailer.

Examples of previously known forms of fifth wheel hitches including some of the general structural and operational features of the instant invention are disclosed in U.S. Pat. Nos. 2,628,106, 3,722,917, 3,790,189, 3,801,135, 3,807,763, 3,825,281, 3,881,750 and 4,063,749. However, these previously known forms of hitch constructions are either not adapted for use in conjunction with passenger vehicles or are not readily mountable in the trunk compartments of passenger vehicles in a manner not requiring more than minimal maintenance and enabling ready coupling with an associated fifth wheel trailer.

BRIEF DESCRIPTION OF THE INVENTION

The fifth wheel trailer hitch of the instant invention is designed to be substantially entirely received within the trunk compartment of the associated vehicle with only the upper terminal end portion of the tubular standard member thereof projecting upwardly through an opening provided in the horizontal body portion of the passenger vehicle disposed immediately forward of the forward edge of the trunk lid thereof. In this manner, the trailer hitch may be mounted within different makes of passenger vehicles with only minimum alterations to the associated vehicle.

The main object of this invention is to provide a trailer hitch for use in conjunction with a conventional passenger vehicle and enabling a fifth wheel-type of trailer to be towed behind the passenger vehicle.

Another object of this invention is to provide a trailer hitch which may be substantially completely mounted within the trunk area of an associated passenger vehicle.

Another important object of this invention is to provide a trailer hitch in accordance with the preceding object and which may be mounted on an associated vehicle with a minimum of alterations required to that vehicle.

A still further object of this invention is to provide a trailer hitch which, when not in use, will only have a small portion thereof visible from the exterior of the associated vehicle.

A final object of this invention to be specifically enumerated herein is to provide a fifth wheel trailer hitch in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
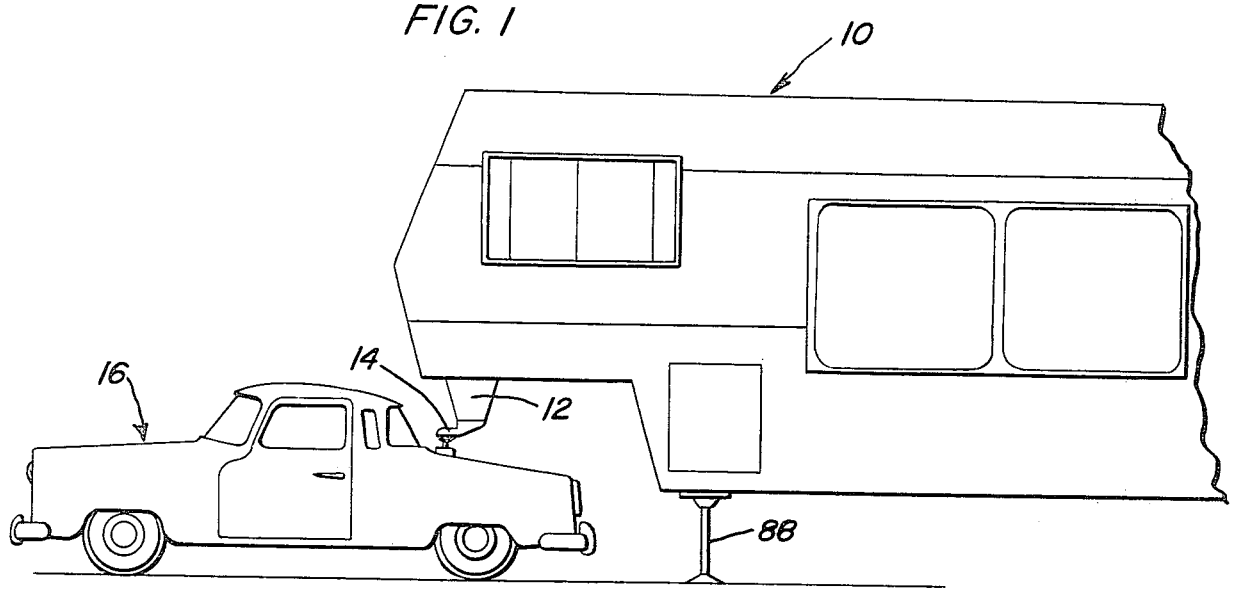
FIG. 1 is a side elevational view of a conventional form of passenger vehicle equipped with the trailer hitch of the instant invention and with the hitch being utilized to couple a fifth wheel trailer to the passenger vehicle.
Figure 2:
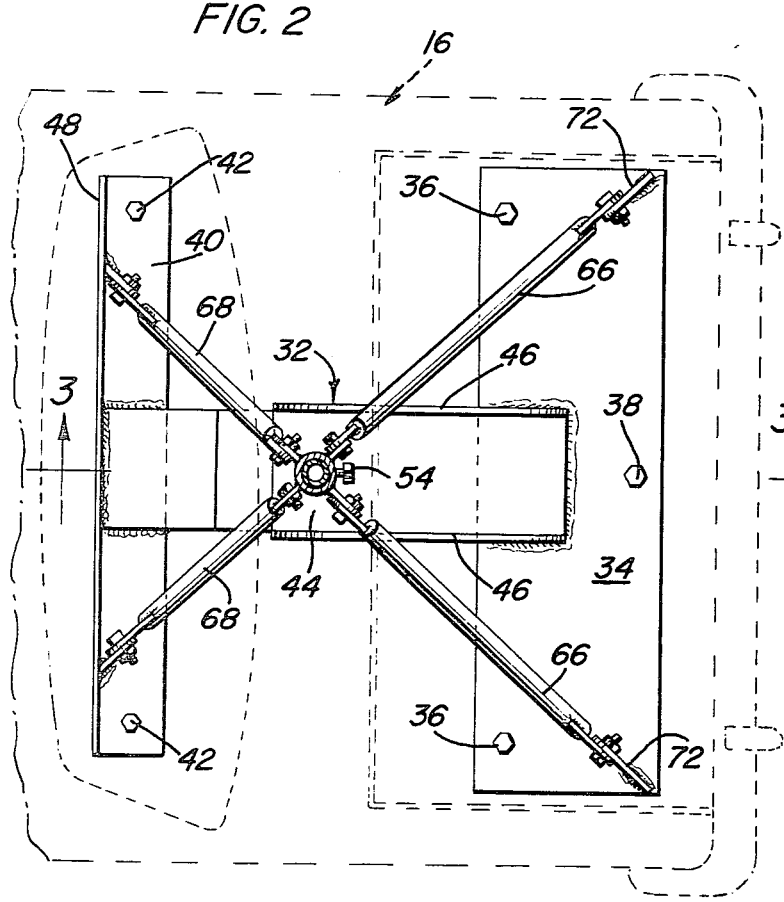
FIG. 2 is an enlarged top plan view of the trailer hitch and with the adjacent components of the associated vehicle illustrated in phantom lines.
Figure 5:
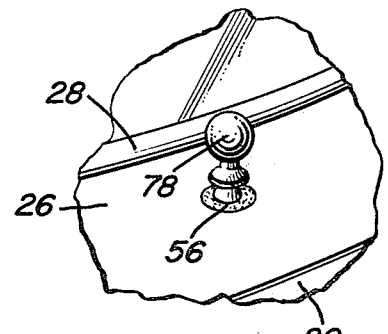
FIG. 5 is a fragmentary perspective view illustrating the portion of the hitch viewable from the exterior of the vehicle and with the hitch ball member supported therefrom.

Referring now more specifically to the drawings, the numeral 10 generally designates a conventional form of fifth wheel trailer including a forward depending hitch portion 12 equipped with a hitch socket member 14. A conventional form of passenger vehicle is referred to in general by the reference numeral 16 and includes a rear trunk area 18 opening upwardly and rearwardly and removably closed by a hinged trunk lid 20. The trunk area 18 includes a rear lower floor portion 22 and a forward upper floor portion 24. The vehicle 16 includes a generally horizontal body portion 26 spaced intermediate and defining the forward edge of the trunk lid 20 and the rear marginal edge of the rear window 28 of the vehicle 16.

The hitch construction of the instant invention is referred to in general by the reference numeral 30 and includes a base plate assembly referred to in general by the reference numeral 32. The base plate assembly 32 includes a rear plate portion 34 overlying and secured to floor portion 22 by means of suitable fasteners 36 and 38 and a forward plate portion 40 overlying and secured to the floor portion 24 by means of fasteners 42. A forwardly and upwardly inclined intermediate plate portion 44 extends forwardly and upwardly from the forward extremity of the plate portion 34 to the rear extremity of the plate portion 40 and is rigid with each of the portions 34 and 40 and also braced relative thereto by means of upstanding gussets 46. The forward marginal edge of the plate portion 40 includes an upstanding flange 48 which abuts against the rear side of the front wall 50 of the trunk area 18 and upwardly opening socket 52 is anchored to the central forward portion of the plate portion 34 and includes a set screw 54. The lower end of a tubular standard 56 is secured in the socket 52 by the set screw 54 and includes three peripherally spaced lower set screws 58 threadedly engaged therewith. The upper end of the standard 56 projects through an opening 60 provided therefor in the body portion 26 and an anchor collar 62 is secured to the upper end portion of the standard 56 below the body portion 26 and includes four radially outwardly projecting and outwardly and downwardly inclined apertured mounting flanges 64. The upper ends of two pairs of inclined braces 66 and 68 are secured to the flanges 64 by means of suitable fasteners 70 and the lower ends of the braces 66 and 68 are secured to inclined apertured mounting flanges 72 and 74 carried by opposite side portions of the plate portions 34 and 40 by means of fasteners 76. Thus, the standard 56 is rigidly supported within the trunk area 18 and has its upper end projecting upwardly through the opening 60.

A hitch ball 78 is provided and includes a depending cylindrical shank 80 removably telescoped downwardly into the standard 56. The hitch ball 78 includes an enlarged base 82 defining a downwardly facing abutment surface which abuts against the upper end of the standard 56 and the lower end of the stem 80 is equipped with a circumferential groove 84 within which the set screws 58 are seated in order to releasably secure the stem 80 within the standard 56.

When it is desired to hitch the trailer 10 to the vehicle 16, the jack legs 88 of the trailer 10 are adjusted in order to raise the forward end of the trailer sufficiently to elevate the hitch socket member 14 to a level slightly above the elevation of the hitch ball 78. Then with the hitch ball 78 fully viewable through the rear window of the vehicle 16, the vehicle 16 is backed into position with the ball 78 spaced vertically below the hitch socket member 14. Thereafter, the jack legs 88 of the trailer 10 may be foreshortened in order to lower the hitch socket member 14 into fully seated engagement with the hitch ball 82 whereupon the trailer 10 may be locked in coupled relation relative to the vehicle 16 and the jack legs 88 may be fully retracted.

When the trailer 10 is thus coupled to the vehicle 16, the forward weight of the trailer 10 is generally centered over the rear axle of the vehicle 16, thus affording considerable stability to the forward end of the trailer 10.

Figure 6:
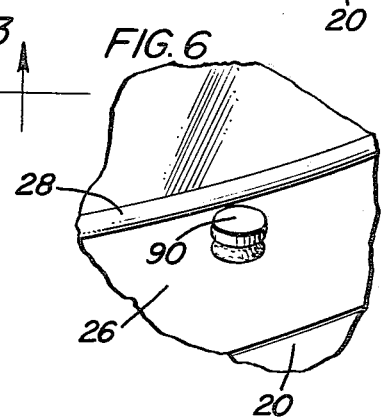
FIG. 6 is a fragmentary perspective view similar to FIG. 5 but with the hitch ball member removed and the upper end of the hitch ball member supporting standard capped with a removable cap.
Figure 3:
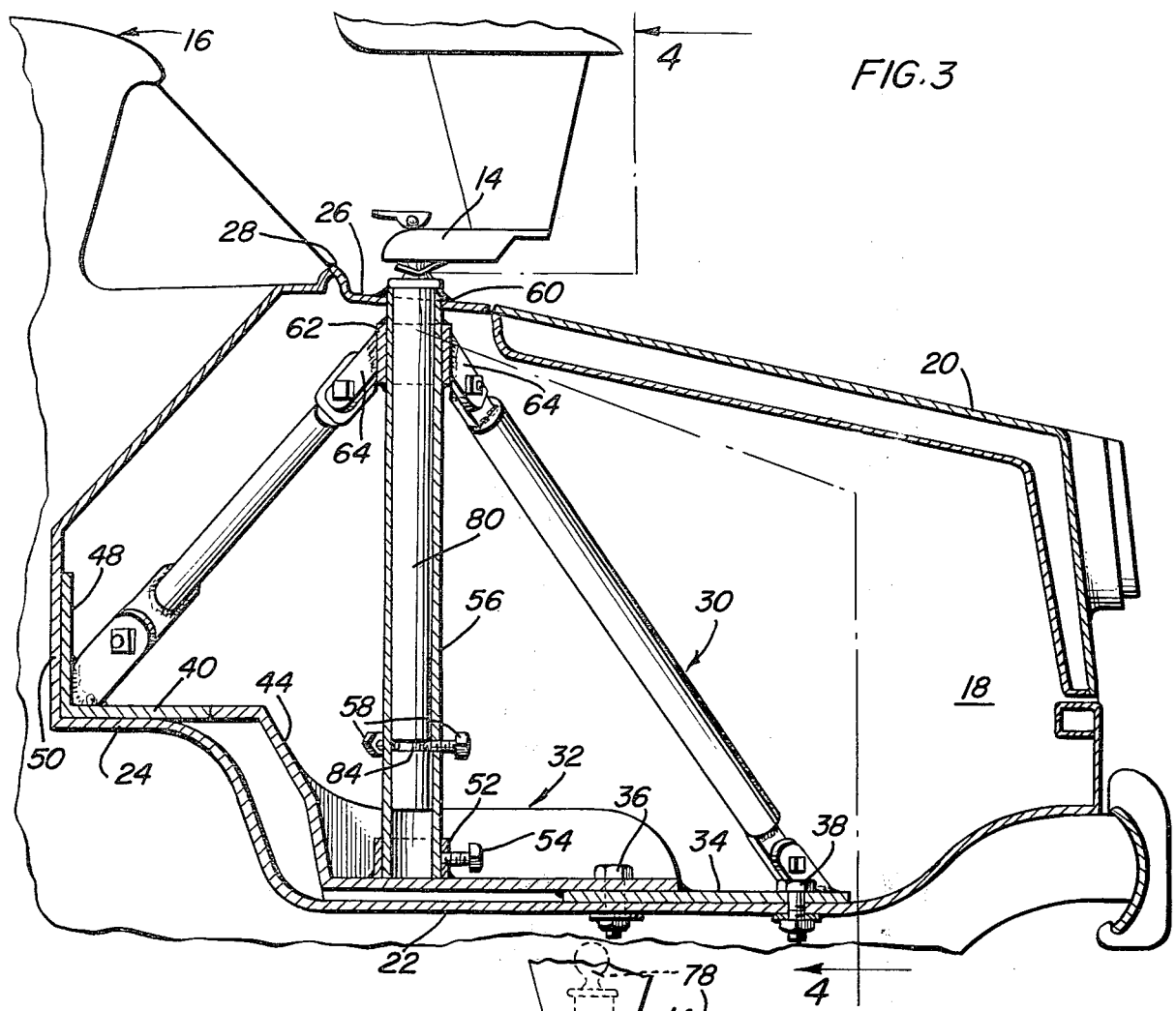
FIG. 3 is an enlarged fragmentary vertical sectional view taken substantially upon the plane indicated by the section line 3—3 of FIG. 2.
Figure 4:
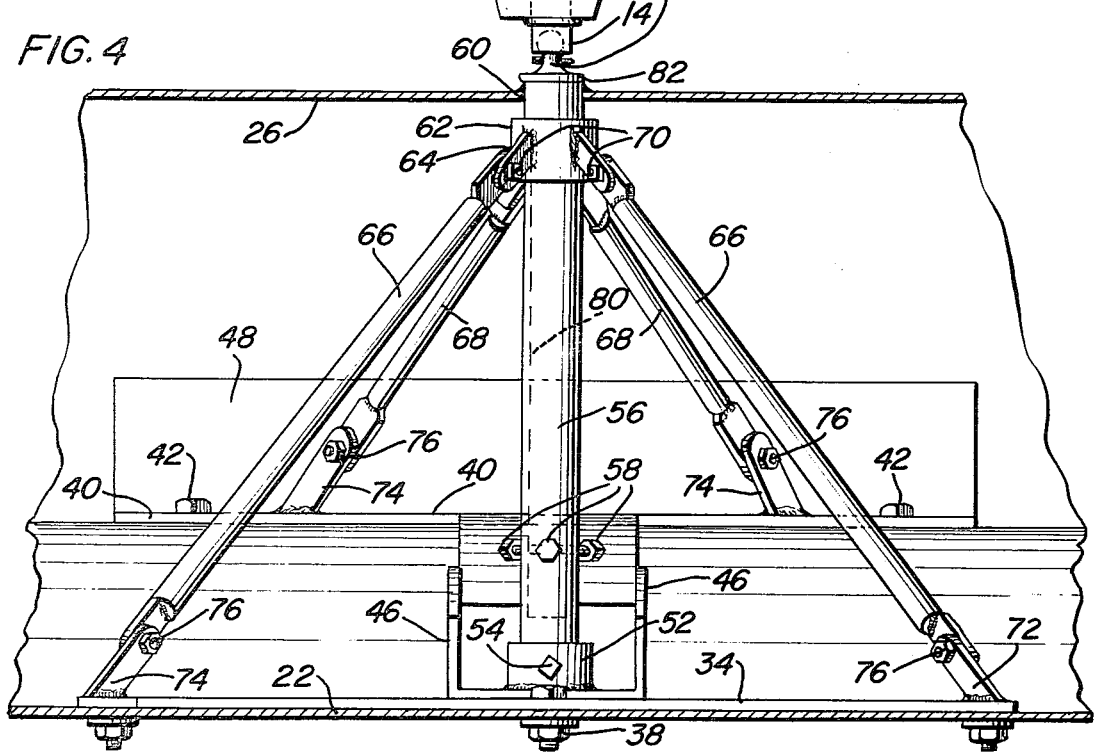
FIG. 4 is a fragmentary vertical sectional view taken substantially upon the plane indicated by the section line 4—4 of FIG. 3.

As may be seen from FIG. 6 of the drawings, when the set screws 58 are backed out of the groove 84, the stem 80 and hitch ball 78 may be removed and a cap 90 may be telescoped over the upper end of the standard 56, the cap 90 being the only portion of the hitch construction 30 then visible from the exterior of the vehicle 16.

It will, of course, be appreciated that the hitch construction may be readily constructed in different sizes so as to be adapted for securement within the hitch compartments of various different makes of passenger vehicles. Further, it is pointed out that the weight of the forward end of the trailer 10 is supported by the stem 80 and transferred to the lower end portion of the standard 52 through the set screws 58. Thus, with the upper end of the stem 80 rigidly braced by the standard 56 which is in turn braced by the collar 62 and the braces 66 and 68, an extremely rigid and durable hitch construction is provided. Further, should the vehicle 16 be hit, not too severely, from the rear when the trailer 10 is not coupled thereto, minor damage to the rear end of the vehicle 16 will not interfere with the ability of the trailer 10 to be safely coupled to the vehicle 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle body defining a rear rearwardly and upwardly opening storage compartment, having a cover shiftably supported from the body for movement into and out of position closing said compartment and including a stationary body portion defining an upper forward extremity of said compartment spaced above a floor portion of said compartment and disposed immediately to the rear of the lower marginal edge of a rear window of said vehicle, a tow hitch construction including base plate means overlying and anchored relative to said floor portion within said compartment, stationary vertical tubular standard means anchored at its lower end to a central portion of said base plate means, inclined brace means extending and anchored between front and rear opposite side upper portions of said standard means within said compartment and corresponding front and rear opposite side portions of said base plate means at points spaced outwardly from and about the lower end of said standard means, said stationary body portion having an opening formed therethrough upwardly through which the upper end of said standard means projects, and hitch means including a depending stem, said hitch means stem being freely removably downwardly telescoped into standard means, anchor means carried by a lower portion of said standard means within said compartment releasably anchoring said stem in operative position relative to said standard means against lengthwise shifting of said stem relative to said standard means and with said hitch means disposed above said tubular standard means, said hitch means including an enlarged portion overlying and bearing downward on the upper end of said standard means when the latter is anchored in said operative position.

2. The combination of claim 1 wherein said hitch means includes a hitch ball member above said enlarged portion.

3. The combination of claim 2 including a cap removably securable over the upper end of said standard means when said hitch means and stem are removed and with said cap overlying the portions of said stationary body portion defining said opening through which said standard projects.

4. The combination of claim 1 including means carried by said standard and base plate means removably anchoring said brace means to said standard and base plate means, means carried by said standard and base plate means removably anchoring said standard to said base plate means.

* * * * *